(12) United States Patent
Smoot et al.

(10) Patent No.: US 7,273,280 B2
(45) Date of Patent: Sep. 25, 2007

(54) INTERACTIVE PROJECTION SYSTEM AND METHOD

(75) Inventors: Lanny Smoot, Thousand Oaks, CA (US); Alfredo Medina Ayala, West Covina, CA (US); William Joseph McArdle, Burbank, CA (US); Arthur Jun Tanaka, Los Angeles, CA (US); Don Kravitz, Los Angeles, CA (US); James Stephen Frankenberger, Simi Valley, CA (US); Deborah Susan Kurth, Los Angeles, CA (US); Kenneth L. Knowles, Malibu, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 11/243,625

(22) Filed: Oct. 4, 2005

(65) Prior Publication Data

US 2006/0072076 A1    Apr. 6, 2006

Related U.S. Application Data

(60) Provisional application No. 60/616,926, filed on Oct. 4, 2004.

(51) Int. Cl.
G03B 21/14         (2006.01)

(52) U.S. Cl. .............................. 353/30; 353/94; 353/29

(58) Field of Classification Search ................ 353/122, 353/79, 46, 42, 29, 101, 30, 94; 382/154, 382/100; 472/57, 71; 715/700; 345/633, 345/419; 40/541; 539/450
See application file for complete search history.

(56) References Cited

U.S. PATENT DOCUMENTS

| 7,227,611 B2 * | 6/2007 | Hull et al. ..................... 352/49 |
| 2004/0102247 A1 | 5/2004 | Smoot et al. |
| 2005/0168448 A1 * | 8/2005 | Simpson ..................... 345/173 |

* cited by examiner

Primary Examiner—William C. Dowling
(74) Attorney, Agent, or Firm—Greenberg Traurig LLP

(57) ABSTRACT

A method and system of selectively projecting images is disclosed. An illuminated area is created on a projection surface by directing a light source to the projection surface. The illuminated area is detected with a camera. Electrical signals are transmitted from the camera to the projector, the electrical signals being indicative of the position of the illuminated area in relation to the projection surface. Based on the received electrical signals, an image and a second image are projected on the projection surface. The image is projected on the illuminated area of the projection surface. The second image is projected on an area of the projection surface that is not illuminated by the light source. Applications of this method and system include the projection of background and foreground images creating the illusion of an x-ray beam, the projection of a normal image and an overblown image creating the illusion of a magnifying light beam.

47 Claims, 13 Drawing Sheets

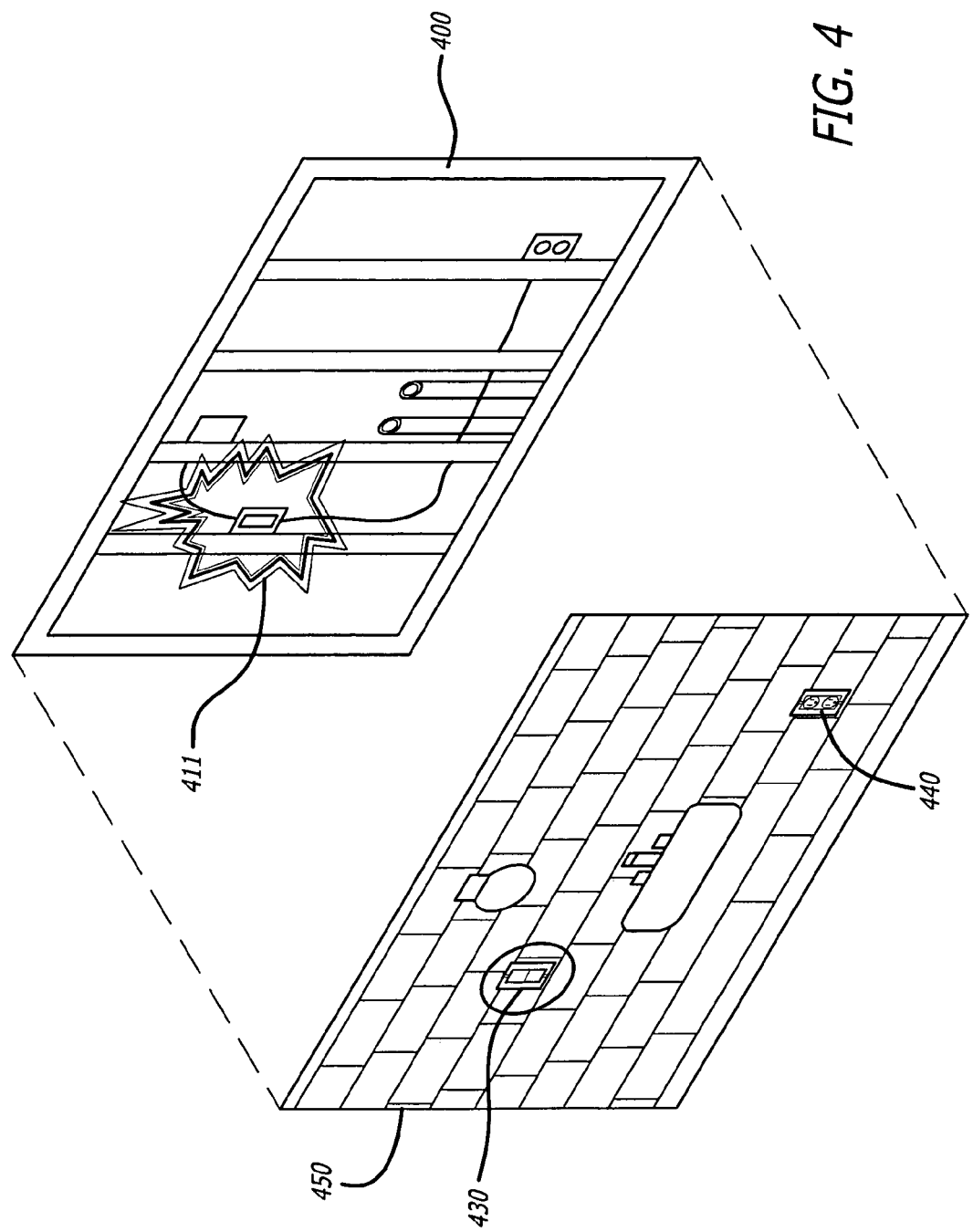

INTERACTIVE PROJECTION SYSTEM AND METHOD

CROSS-REFERENCE TO RELATED APPLICATIONS

This application claims the benefit of the prior filing date of U.S. provisional patent application No. 60/616,926, filed Oct. 4, 2004, herein incorporated by reference in its entirety.

BACKGROUND OF THE DISCLOSURE

1. Field of the Disclosure

The present disclosure relates to projection systems. In particular, it relates to entertainment projection systems to provide an illusory reality to the observer.

2. General Background

Entertainment environments are always seeking to provide guests with extraordinary and unforgettable experiences that they could not otherwise live through in their day-to-day lives. A common fantasy that would be an extraordinary experience is to have "x-ray" vision—the ability to look through solid matter and seeing what is inside a certain object or behind a particular wall. In an entertainment environment, it is therefore desirable to provide the guest with the illusion of seeing through objects as if the guest had x-ray vision.

In educational environments, it is likewise desirable to show the insides of certain objects to realistically demonstrate the functioning of the object. Allowing the student to view through the outside casing of a machine, for example, would prove an ideal academic setting to teach the workings of such machine.

SUMMARY

A system and a method for selectively projecting images on a projection surface is disclosed. A projection surface is for example a projection screen, a wall, a box shaped object, or other three-dimensional surface, etc. A first image and a second image are provided for projection onto the projection surface. The first image is projected on the projection surface. A light source is provided which when focused on the projection surface, provides an illuminated area on the projection surface. The illuminated area is produced by a light source generally in the form of a single or multiple beams being focused on the projection surface. The second image is projected within the illuminated area on the projection surface in place of the first image.

In one aspect, this is achieved by combining the first image and second image to yield a final projection image. A detection mechanism is provided to detect the illuminated area on the projection surface. The detection mechanism is generally a camera that is sensitive to the wavelength or wavelengths of light produced by the light source. For example, if the type of light emitted by the light source is infrared light, then the camera should be an infrared sensitive camera. The final image is constructed by combining at least the portion of the second image where the illuminated area is detected in relation to the screen with the rest of the first image.

Consequently, when constructing the final image, if there is no light source focused on the projection surface the final image is the first image, and therefore the first image is projected in its entirety on the projection surface. If a light beam is projected onto the projection surface, the illuminated area is projected with parts of the second image. Ideally, the projected parts of the second image will produce an illusory effect.

For example, in one embodiment, the first image is an image of the outside appearance of an item and the second image is a background view of the item, or alternatively, its internal composition. So if the first image is the image of a brick wall, and there are no light beams projected onto the projection surface (e.g. a projection screen), the final projected image will be the foreground or outside appearance of the wall. Further, when a light beam is directed to the screen the illuminated area is projected with a portion of the second image. The second image corresponds to an image depicting what is behind the wall. Thus, pointing the light beam at the screen creates the illusion of a hole in the wall through which one can see the objects behind the wall.

In another embodiment, the first image is the normal view of the image, and the second image is an overblown or magnified view of the image. Thus, if the first image is a city map, when a light beam is focused on the screen the illuminated area is projected with the overblown image corresponding to the illuminated section of the map. Thus pointing the light beam at the screen creates the illusion of a magnifying light beam.

In yet another aspect, the first image depicts the present appearance of the object, and the second image depicts the future or past appearance of the object. Thus if the first image is the picture of a person, when a light beam is focused on the screen the illuminated area is projected with the image of the future appearance of the person. In this manner, pointing the light beam at the screen creates the illusion of a time-travel light beam.

In one aspect, the system can further include a keyer. The keyer receives input from the camera indicating the position of the illuminated area in relation to the projection surface. The keyer then utilizes the input received from the camera to create the first image and the second image. The keyer can utilize input from a first video generator to create the first image, and input from a second video generator to create the second image.

In another aspect, a computing device is also used. The computer device constructs a final image to be projected on the projection surface, the final image including the first image and the second image.

In another aspect, a second light source creates a second illuminated area on the projection surface, wherein the projector projects a third image on the illuminated area of the projection surface.

In another aspect, a second projector that receives electrical signals from the camera indicative of the position of the illuminated area in relation to the projection surface. The projector projects the first image on the illuminated area of the projection surface; the second projector projects the second image on an area of the projection surface that is not illuminated by the light source.

In one aspect, a method selectively projects images on a projection surface. An illuminated area is created on the projection surface by directing a light source to the projection surface. The illuminated area is detected with a camera. Electrical signals are transmitted from the camera to the projector, the electrical signals being indicative of the position of the illuminated area in relation to the projection surface. Based on the received electrical signals, a first image and a second image are projected on the projection surface. The first image is projected on the illuminated area of the projection surface. The second image is projected on an area of the projection surface that is not illuminated by the light source.

In another aspect, there is a method of identifying an illuminator focusing light on a target area of a projection surface. A plurality of illuminators and a back channel to each of the illuminators is provided. Each of the illuminators illuminating an area of the projection surface. The back channel to each of the plurality of illuminators is connected to a central computer. A camera detects whether the target area on the projection surface has being illuminated. Then an initial amount of light energy measured at the target area. Each of the plurality of illuminators is sequentially turning off, the plurality of illuminators being turned off through the back channel by the central computer, wherein after turning off each of the plurality of illuminators, the resulting light energy of the target area is measured. The resulting light energy of the target area is compared with an initial amount of light energy at the target area to determine whether the resulting light energy is different in comparison with the initial amount of light energy. If there is a difference, the illuminator that was last turned off is identified as the illuminator focusing light on a target area of the projection screen.

BRIEF DESCRIPTION OF THE DRAWINGS

By way of example, reference will now be made to the accompanying drawings.

FIG. 4 illustrates a top perspective view of the projection of a wall and the internal components of a wall wherein a sparking condition.

DETAILED DESCRIPTION

Projection systems traditionally provide the viewer with a projection image upon which the viewer has no control. The viewer has control to fast forward, stop, rewind, etc. However, the contents of the image that is being projected are generally non-interactive.

The method and system described below allow a user to interact with what is displayed on a screen. The system selectively projects images based upon feedback from an independent source focused on the projection screen. The independent source can be a light source, a magnetic source, etc., that is controlled by the viewer. The projected image can be altered depending on various factors such as movement of the independent source and intensity of the emitted energy from the independent source. For instance, if the independent source is a light source, the viewer can focus the light on the screen. Then, an image is projected where the light source is focused. As the light source moves and focuses on other areas of the screen, the projected image can change. In one embodiment, the image projected on the illuminated section of the screen is an image representing what is behind the screen. Thus, the user can be provided with the illusion that it is possible to see through a wall or inside an object. This and various other features of this system and method are described below.

Figure 1A:
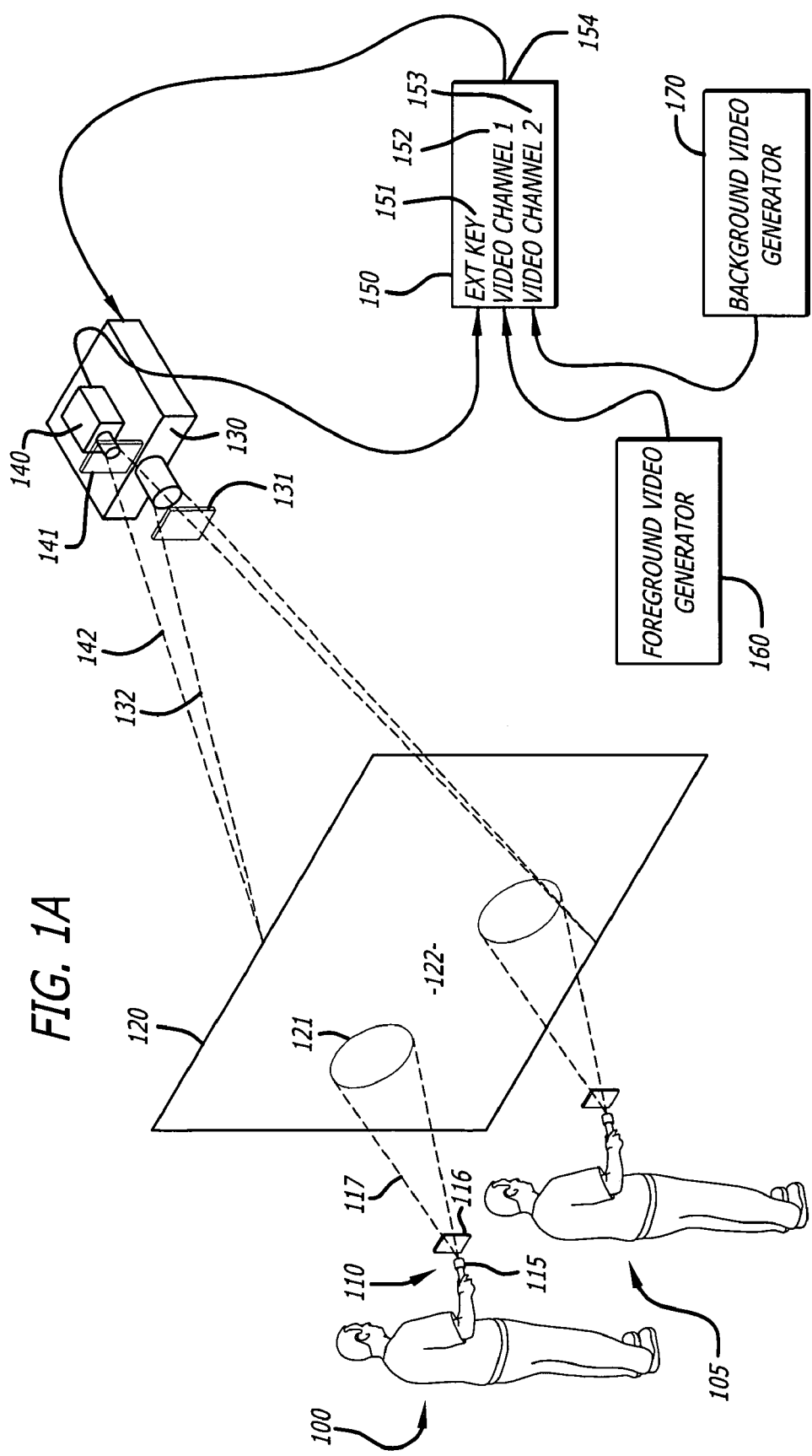
FIG. 1A illustrates a component diagram of an interactive video projection system.

FIG. 1A illustrates a component diagram of an interactive video projection system. A user 100 can be provided with a pointing device 110 to point at a projection surface 120. A second user 105 may simultaneously hold another pointing device and point to projection surface 120.

In one embodiment, the pointing device 110 can be a handheld incandescent flashlight 115. The handheld incandescent flashlight 115 can include an optical filter 116 mounted in front. In one embodiment, the optical filter 116 filters the near-infrared portion of the optical spectrum. That is, the light emitted by flashlight 115 is filtered such that only the infrared emission of the light passes through. This permits the light 117 to be invisible to the human eye. In another embodiment, the optical filter 116 filters other electromagnetic frequencies. In yet another embodiment, the filter 116 can be partially or totally removed such that the light 117 is visible to the user 100.

When using an optical filter 116 that is an infrared filter, certain high ambient light environments make it difficult to detect the relatively small amount of infrared light coming from the pointing device 110. This is generally because of the presence of large amounts of ambient infrared radiation present. To help the user 100 to view where the flashlight 115 is pointing to, a laser light source may be used. In another embodiment, a collimated high power light emitting diode source may be used as the pointing device 110.

The light 117 can be focused on the projection surface 120. In one embodiment, the projection surface 120 is a translucent projection screen through which visible and infrared light can pass through the projection surface 120. As a result, light that passes through can be viewed and detected by a camera 140.

A projector 130 projects images or videos onto the projection surface 120. In one embodiment, the projector 130 is located on one side of the projection surface 120 and the user is located on the other side of the projection surface 120. In such case, the projector 130 is a rear-projector. In another embodiment, the projector 130 can be placed on the same side of the projection surface 120 where the user 100 is located. The projector 130 can be placed so as to prevent a user 100 from inadvertently blocking the light from the projector 130.

In one embodiment, the projector 130 can further be equipped with an infrared blocking filter 131 placed in the light path of projector 130. The blocking filter 131 allows visible light to pass, and blocks infrared light so that the projected image does not contain infrared light that can be confused as infrared light emitted by the pointing device 110.

The infrared sensitive camera 140 receives any infrared light emitted off the projection surface 120. The camera 140 is aligned to have its incoming field of view 142 coincident with projection rays 132 of video projector 130 causing a one to one correspondence between pixel positions on projection surface 120, and the analogous pixel positions in the video camera 140. In one embodiment, a beam-splitter can be used to ensure a one-to-one pixel matching in critical applications. The infrared sensitive camera 140 is sensitive to the invisible infrared illumination of flashlight 110 but is not sensitive to the light emitted by projector 130. This separation in spectra can be guaranteed by the use of an infrared pass filter 141 in the light path of camera 140.

A video keyer 150 receives the video signal from camera 140 at the external keying input 151. In one embodiment, the video keyer 150 is a computing device configured to process video. The video keyer 150 receives input from a foreground video image generator 160 and from a background image generator 170.

The foreground image generator 160 generates the image to be seen in area 122 of the projection screen 120, and transmits that image to a first input video channel 152 of the video keyer 150. The background video image generator 170 provides the image to be seen in area 121 of the projection screen 120, and transmits that image to a second input video channel 153 of the video keyer 150. In one embodiment, area 122 can encompass all the area in projection surface 120, except for area 121.

In one embodiment, the keying threshold levels on keyer 150 can be adjusted to create a foreground image that will be uniformly projected over the entire projection surface 120, and will be selectively replaced in area 121 of the projection surface 120. Furthermore, the keyer 120 can select or create a background image that will be projected on areas of the projection surface 120 where infrared energy from handheld device 110 is detected, such as area 121. Having created the two images to be projected in areas 121 and 122, the video keyer 150 combines both images to form a single projected image that covers the entire projection surface 120. The single projected image is constructed by selectively cutting off from the foreground image a section that corresponds to the area 121 and replacing the section that was cut off with the background image. In one embodiment, the image projected in area 121 is a monoscopic image. In another embodiment, the image projected in area 121 is a stereo projection. Accordingly, users 110 and 105 are provided with capability to interact with the projection system such that the projected image content changes depending on user 100 input.

Figure 1B:
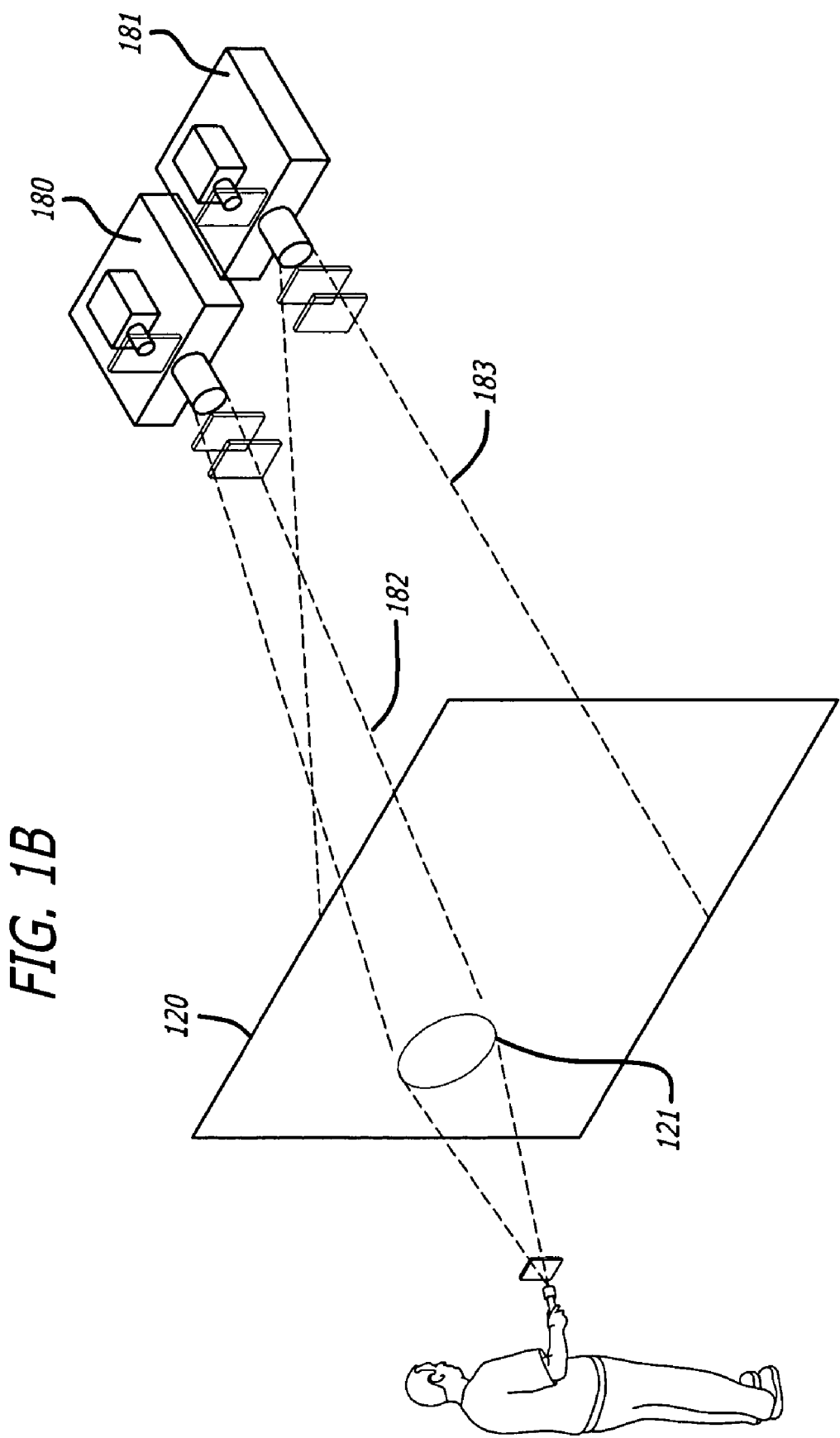
FIG. 1B illustrates a component diagram of an interactive video projection system where more than one projector is used.

FIG. 1B illustrates a component diagram of an interactive video projection system where more than one projector is used. In one embodiment, two projectors can be used. A first projector 180 projects the background image 182 and is solely directed to project on area 121. The second projector 181 projects the foreground image 183 to the entire projection surface 120 except the area 121 where the first projector 180 is projecting.

X-Ray Simulation

An x-ray flashlight effect can be accomplished by projecting in area 122 a foreground image showing the external appearance of an object, and projecting in area 121 a background image showing the internal appearance of an object. The user 100 can use the pointing device 110 to shine simulated x-ray energy onto the projection surface 120, thereby exposing the background image to see objects "behind" the outside surfaces. For example, the user 100 may peer through the outside walls of the house of a cartoon character in order to expose the cartoon character that lives inside the house. The user 100 can also engage in a game where the objective would be to find clues or tokens that had been hidden, for instance, inside the walls, floors, and ceilings of a building, or inside sealed boxes, or behind curtains. In one embodiment, real walls, floors, ceilings, and even props of a setting can be used as projection surfaces.

Figure 2:
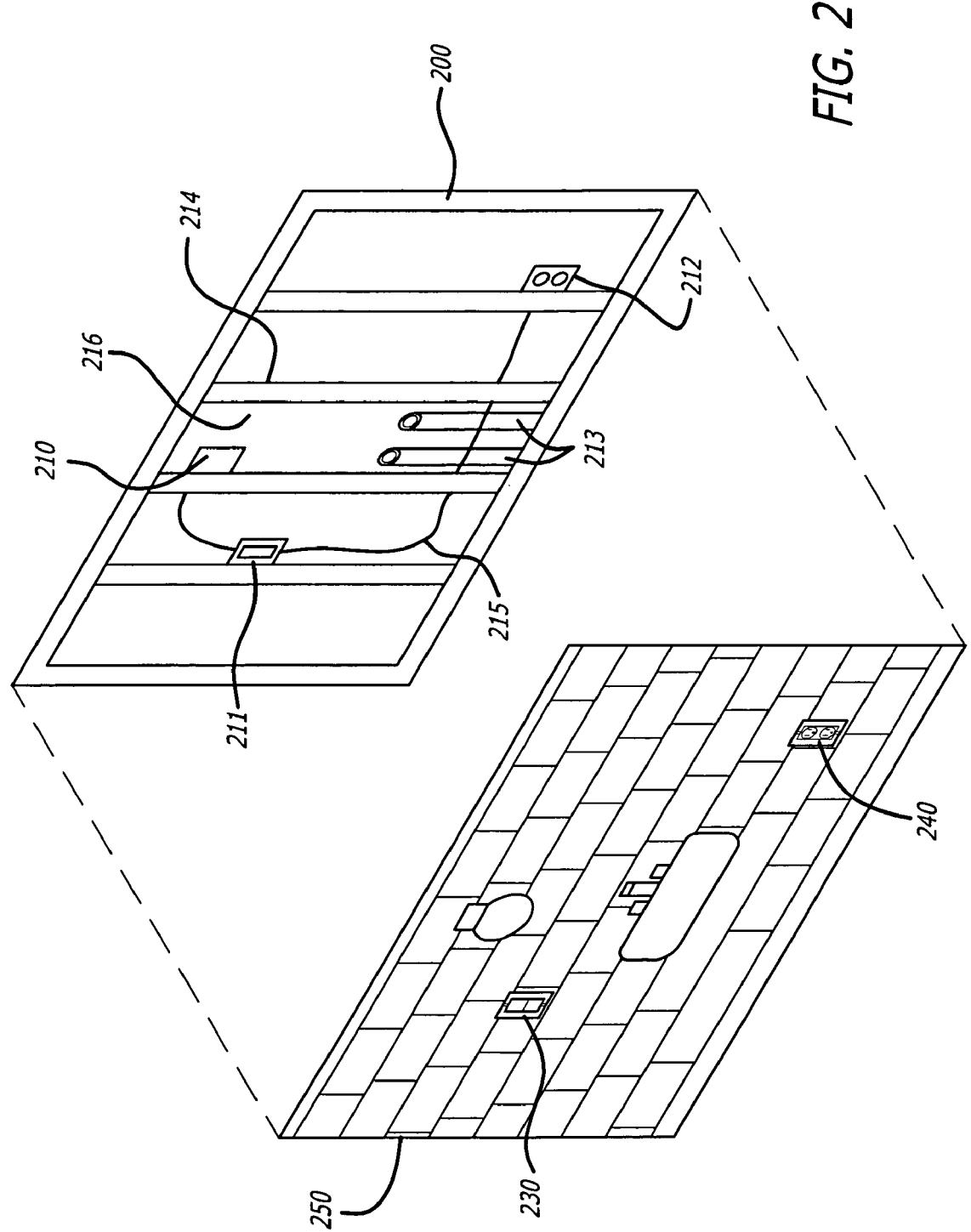
FIG. 2 illustrates a top perspective view of the projection of a wall and the internal components of a wall.

FIG. 2 illustrates a top perspective view of a foreground image 250 that shows a wall projection, and a corresponding background image 200 depicting the internal components of the wall. The background video image 200 may have several areas of interest such as an electrical box 210, a switch box 211, an electrical outlet box 212, and hot and cold water pipes 213. The foreground image 250 may be superimposed on background image 200 in a carefully coordinated manner so that features of the foreground image 250 directly correspond to features of the background image 200. For instance, the user 100 can direct the pointing device 110 at the foreground image 250 to unveil vertically running two-by-four wooden studs 214, hot and cold water pipes 213, electrical wiring 215, and electrical outlet and switch boxes 210, 211, 212. The foreground image 250 contains corresponding images that map to the images of the background image 200. For example, an outlet box 212 in the background image 200 corresponds to an outlet receptacle 240 on the foreground image 250. In like manner, light switch 230 is present in the foreground 250 with electrical box 211 holding the switch mechanisms. Hot and cold water pipes 213 might have visible valves 245 on the surface of the wall.

Both the underlying and hidden layers can consist of either still images, or moving images so that a user "x-raying" a wall can locate a moving cartoon character hidden behind the wall surface. Likewise, in a whimsical rendition, a squirrel crawling on the outside wall of a home can be shown as a skeletal creature still crawling on an ephemerally-rendered surface of the wall in the "x-ray" view. In this manner, a user can have the illusion of being able to look right through an obscuring surface to see objects behind the surface.

Image Analysis

In some instances, the ability to cleanly crop the foreground and background video images may be hampered by an uneven or ragged-edged beam pattern produced by the pointing device 110. Such raggedness in projection of the actual emitted infrared or visible light will translate into an irregularity in the shape of the projected cutout of a final projected image. Although in some applications this may add a desired sense of realism to the images, in others, it may detract from the attractiveness or clarity of the displayed imagery.

Figure 3:
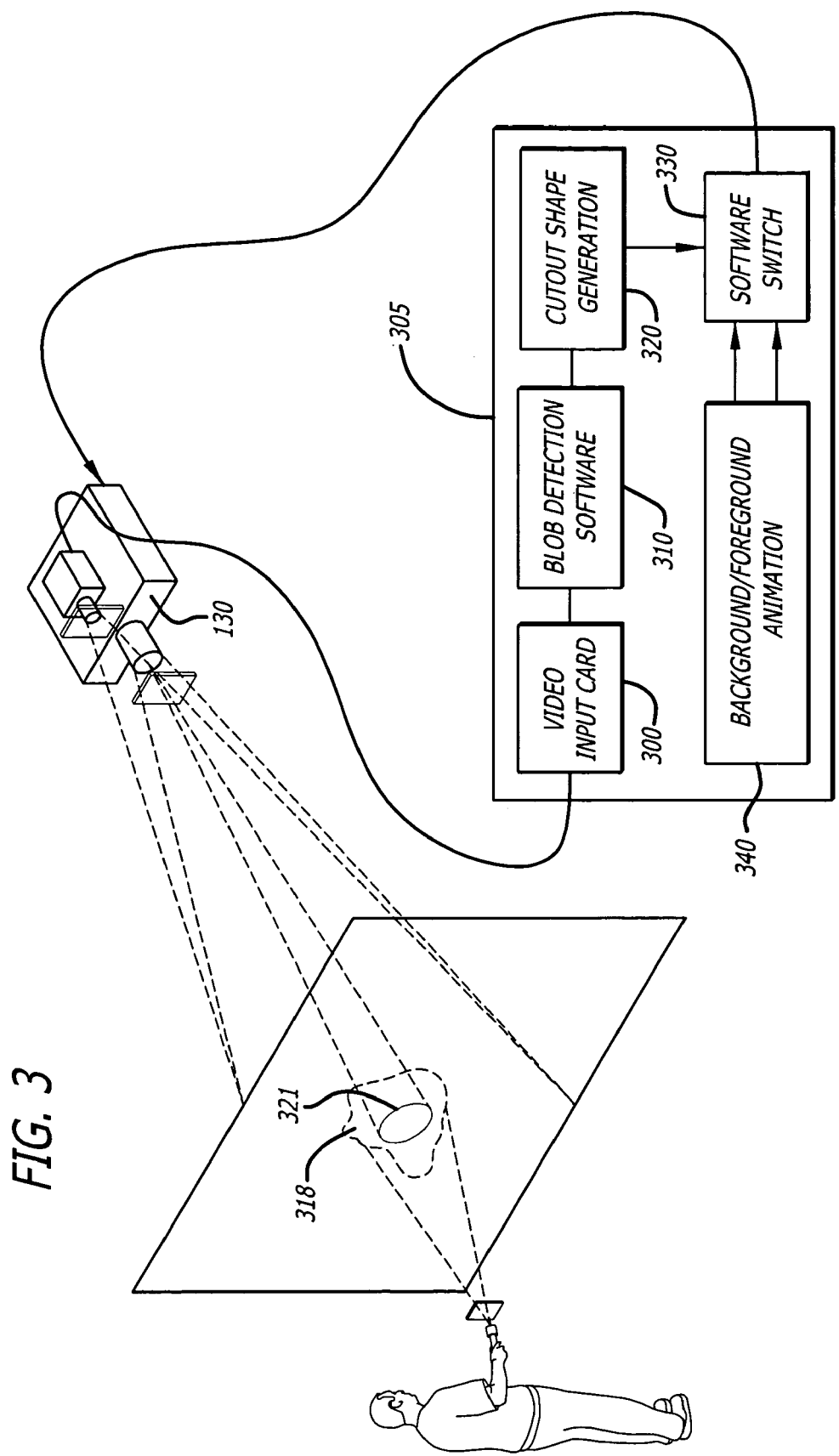
FIG. 3 illustrates a component diagram of an interactive video projection system incorporating an image analysis computer.

FIG. 3 illustrates a component diagram of an interactive video projection system incorporating an image analysis computer 305. Video information from the camera 140 is delivered to a video input card 300 in the image analysis computer 305. The image analysis computer 305 can be a personal computer, a laptop, a server, etc.

In one embodiment, the position of the area 318 produced by the pointing device 110 can be used to identify the position of an artificially generated spotlight 321. The artificially generated spotlight 321 can be made in the shape of a cutout shape.

The video acquired by camera 140 is applied to an image-processing algorithm implemented by a blob detection software 310. The coordinates for multiple centroids of the pointing device 110 are derived and used to control the position of the cutout shape generated by a cutout shape generation process 320. The cutout shape generated by the generation process 320 is used by a control software video switch 330. The control video switch 330 selects whether pixels from the stored background image or foreground image are transmitted to projector 130. The shape of the cutout can be an arrow, a cross, a circle, an ellipse, or any other geometrical or non-geometrical shape.

Moving Video Images

In yet another embodiment, in order to enhance the interactivity of the user, once the pointing device 110 is focused on a particular area of the projection surface 120, a hidden object can be projected while simultaneously an audio signal can be emitted.

FIG. 4 illustrates a top perspective view of the foreground image 450 corresponding to the projection of a wall and the background image 400 corresponding to internal components of the wall wherein an explosion 411 occurs. In one embodiment, such as an educational application concerning fire safety, the user 110 can be provided with an "x-ray flashlight" as a pointing device 110 and told to explore aspects of a home for hidden safety issues. The user 100 looks through the interior walls of a simulated home to find potentially under-gauged electrical wiring sparking. Once the pointing device 110 focuses on the electrical switch 430, the electrical box 411 would appear in a moving video in imminent danger of catching fire. The sparking sound could start playing only upon the pointing device 110 being focused over the electrical switch 430. In another embodiment, sound effects could accompany the projection of images even when the pointing device 110 is not being focused over a certain area of the foreground image 450.

In another embodiment, a hidden character can react upon being discovered. For instance, a cartoon character in a stylized home could react with hand to mouth and with an audible gasp upon being discovered in its "habitat," and the movement and sound actions would only occur as the flashlight is pointing towards them. More than one sequence, used in a semi-random series, may advantageously be employed to maintain the novelty of the interaction with the user.

In yet another embodiment, once the light beam is focused on the screen, the light beam area may be projected with not only the background image, but also a mixed image of the background and the foreground image. This effect may be achieved by mixing pixels of both images to construct the final projected image. They would be able to observe partially the background and the foreground image simultaneously. For example, as show in FIG. 4, the user would then be able to see the electrical switch 410 along with parts of the surrounding wall, and the sparking occurring in electrical box 411.

Identification of the Pointing Device

An interconnected gaming system with a plurality of separate projection screens 120 and a plurality of pointing devices 110 may be used in order to allow multiple users 100 to interact with the system and engage in a game with other users 100. Tallying and keeping score of the number of hidden items discovered by each user 100 can be done by identifying each the pointing device 110 that pointed to the hidden object or performed the winning action.

Figure 5A:
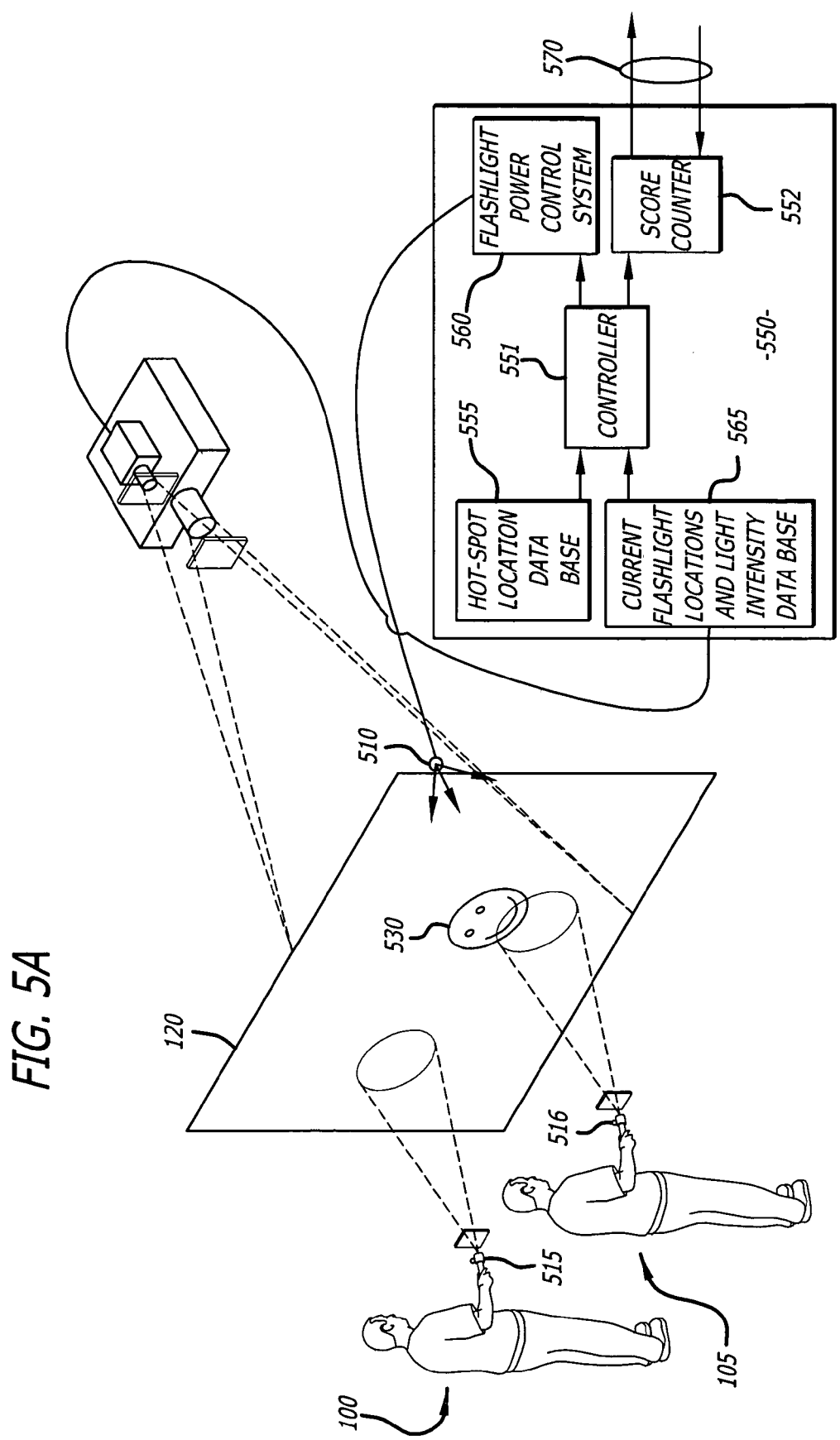
FIG. 5A illustrates a component diagram of an interactive video projection system incorporating a system for light source identifying.

FIG. 5A illustrates a component diagram of an interactive video projection system incorporating a system for light source identifying. Multiple users 100 of the system may each have a pointing device 110 that is uniquely identifiable. Each uniquely identifiable pointing device 110 can be addressed with a back channel from computer control system 550. The back channel obtains the signal received by individual radio frequency or infrared receivers 515 and 516, mounted in each pointing device 110. The receivers 515 and 516 receive the digital radio frequency or infrared data signal from transmitters 510 located near the screen. Circuitry in each pointing device 110, as is well known in the art, can be used to very briefly shut off the pointing device 110 when a unique serial number is broadcasted to the receivers 515 and 516.

In one embodiment, each of separate projection surfaces 120, and their corresponding interactive systems, can be networked so that groups of people, or individuals, may compete for high scores in terms of who can uncover the greatest number of hidden objects, or the highest value objects. Two different users 100 and 105 can independently target the same projection surface 120. If a user 105 discovers hidden object 530 by pointing the pointing device 110 to the correct area on the projection surface 120, user 105 receives points. The locations of hidden objects, also called hotspots, on projection surface 120 is held in hotspot map database 555 in the computer control system 550. The x-y coordinates of each of the pointing devices' 110 beams hitting projection surface 120 is kept in a pointing device location database 565. A controller 551 is used to determine whether a pointing device 110 beam is hitting a particular hotspot. If so, controller 551 commands a pointing device power control system 560 to turn off the pointing devices 110 in the immediate area one at a time. The controller 551 then checks the database containing the pointing devices' 110 locations 565 to see whether the detected power level of current pointing device 110 decreases when a particular pointing device 110 is turned off. If it does, the controller 551 uses the location information to determine that at least the identified pointing device 110 has "scored," and reports the score to the score counter 552. The score counter 552 may communicate over a network 570 with other networked score counters enabling competition across multiple projection system systems.

In one embodiment, the pointing devices 110 present in a particular area can be determined by continuously polling each pointing device 110 and determining whether a light disappears from the projection surface 120. If the light hitting the screen from the position where the object is located diminishes, then the system knows that the pointing device 110 that has just powered off is at least one of the lights currently over a particular projection surface 120 area. In this manner, the system can collect both the identity of the particular pointing device 110, as well as the identity of the object that the user has discovered. Furthermore, the system can report the score at the end of a round so that users can keep score while playing.

In another embodiment, each pointing device 110 can be identified utilizing separate electromagnetic wavelengths. Further, several separate video cameras having filters for specific wavelengths can be used to match each flashlight. Thus, parallel image processing systems can pay attention to what items were discovered by which pointing device 110 according to the wavelength of light.

Three-Dimensional Projection

Figure 5B:
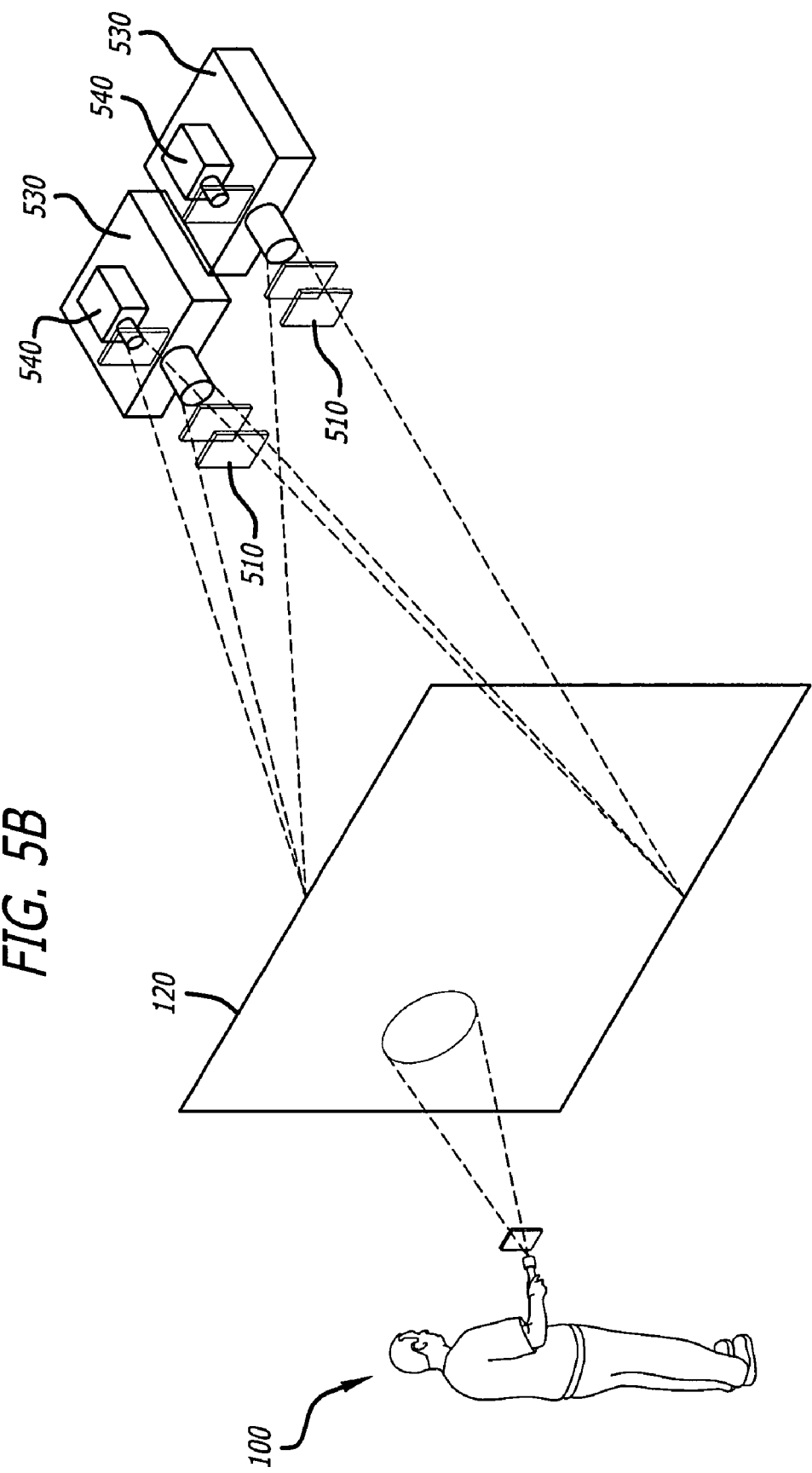
FIG. 5B illustrates a component diagram of an interactive projection video system in which two images are projected on the rear screen to produce the illusion of a three dimensional image.

FIG. 5B illustrates a component diagram of an interactive projection video system in which two images are projected on the rear screen to produce the illusion of a three dimensional image. The images seen as both the background and foreground may be stereoscopically projected. The projectors 530 can simultaneously project an image onto a polarization-maintaining rear projection surface 120. Likewise, the cameras 540 can simultaneously image the polarization-maintaining rear projection surface 120.

The two projectors supply a separate image, one directed to the left eye of the user 100, and the other to the right eye of the user 100. As it will be apparent to one of ordinary skill in the art, the two views can be kept separate by the use of orthogonal polarizers 510 in the light paths of the two projectors. Additionally, the projectors 530 and the cameras 540 are equipped with infrared filters. As stated above, each camera 540 will capture the beam of the flashlight and will cause the analogous portion of the video background image to be swapped with the corresponding foreground image.

In another embodiment, a single video projector with an overall frame-rate of twice that of the frame rate for either eye view may be used along with a high speed electrically activated polarization rotator to alternately project the separate left and right eye views. Using this technique, the stereoscopic image of the foreground can be chosen to occupy a particular depth plane as viewed by the user 100 wearing stereoscopic glasses. The background image can be rendered with a depth plane located considerably behind the depth plane of the foreground plane, and possibly with a varying depth (e.g. sloped background, or one with protrusions). In this way, the image that the user 100 appears to see through the "hole" in the foreground will have a greatly enhanced illusion of depth behind the foreground image. A black ring of no-projection light can be used to separate the two planes and increase the sense of depth using these techniques.

In yet another embodiment, the video signal from one or both of the cameras 540 and 530 may be fed to a computer system that can determine simultaneous cropping areas for both projectors.

Projection on Three-Dimensional Dimensional Objects

Although the technique can be applied to flat surfaces such as walls, floors, or ceilings, it can also be applied to curved surfaces such as to a sphere, or faceted surfaces such as those of a cube, rectangular or slope-sided prism, or other dimensional objects.

Figure 6:
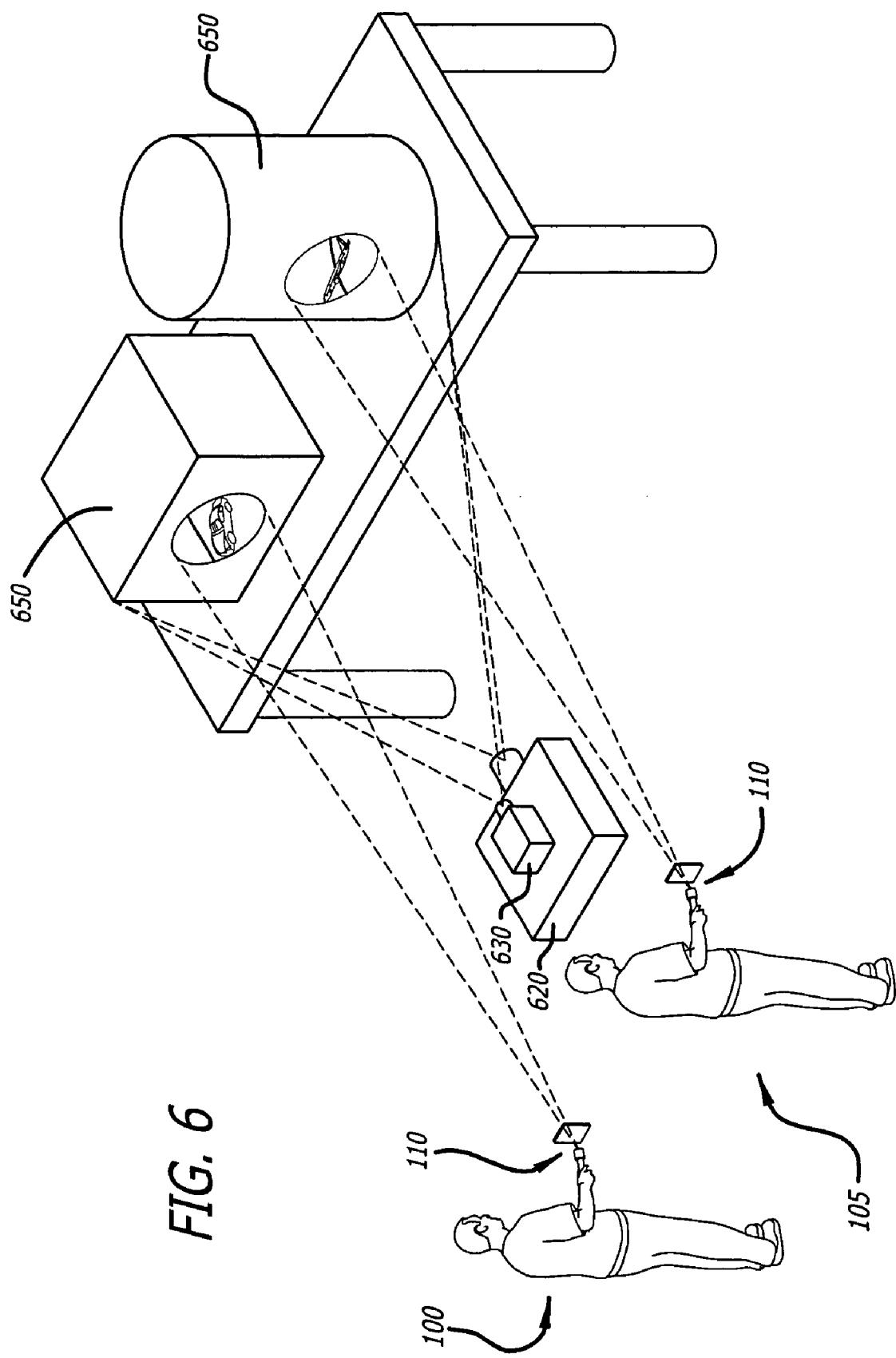
FIG. 6 illustrates a component diagram of an interactive video projection system projecting on three-dimensional objects.

FIG. 6 illustrates a component diagram of an interactive video projection system projecting on three-dimensional objects. In one embodiment, the projection surface can be the surface of a multisided or even rounded three-dimensional object. A user 100, 105 can be provided with the illusion that by using the pointing device 110, it is possible to peer inside of what appears to be a solid object 650. The objects 650 could be, for example, mock holiday gifts in boxes. With the use of the pointing devices 110, the users 100, 105 have the ability to see what appears to be inside each of the boxes 650. The projected image texture maps can be rendered using advanced three-dimensional drawing software tools that allow presentation of geometrically correct images. The images are projected by a projector 620 onto the outside layer of the boxes 650 matching the surface geometry of the boxes 650 thus creating an enhanced sense of depth and reality. Simultaneously, the inside contents of the boxes 650 are conveyed by the background image also projected by projector 620. Once the flashlight is focused on one of the objects 650, the background image is shown thus apparently exposing the proper perspectives of the insides of the three-dimensional boxes 650. Furthermore, the use of video triggers, as described earlier, allows the user to, for instance, see that they have received a "living toy." When the box is illuminated, and the background image is projected, the character comes to life, acting out a song and dance routine. The video shown as the background video is rendered with proper perspective so that the character's lighting, shadows, etc., make it appear to be inside the box.

Spectacles

Figure 7:
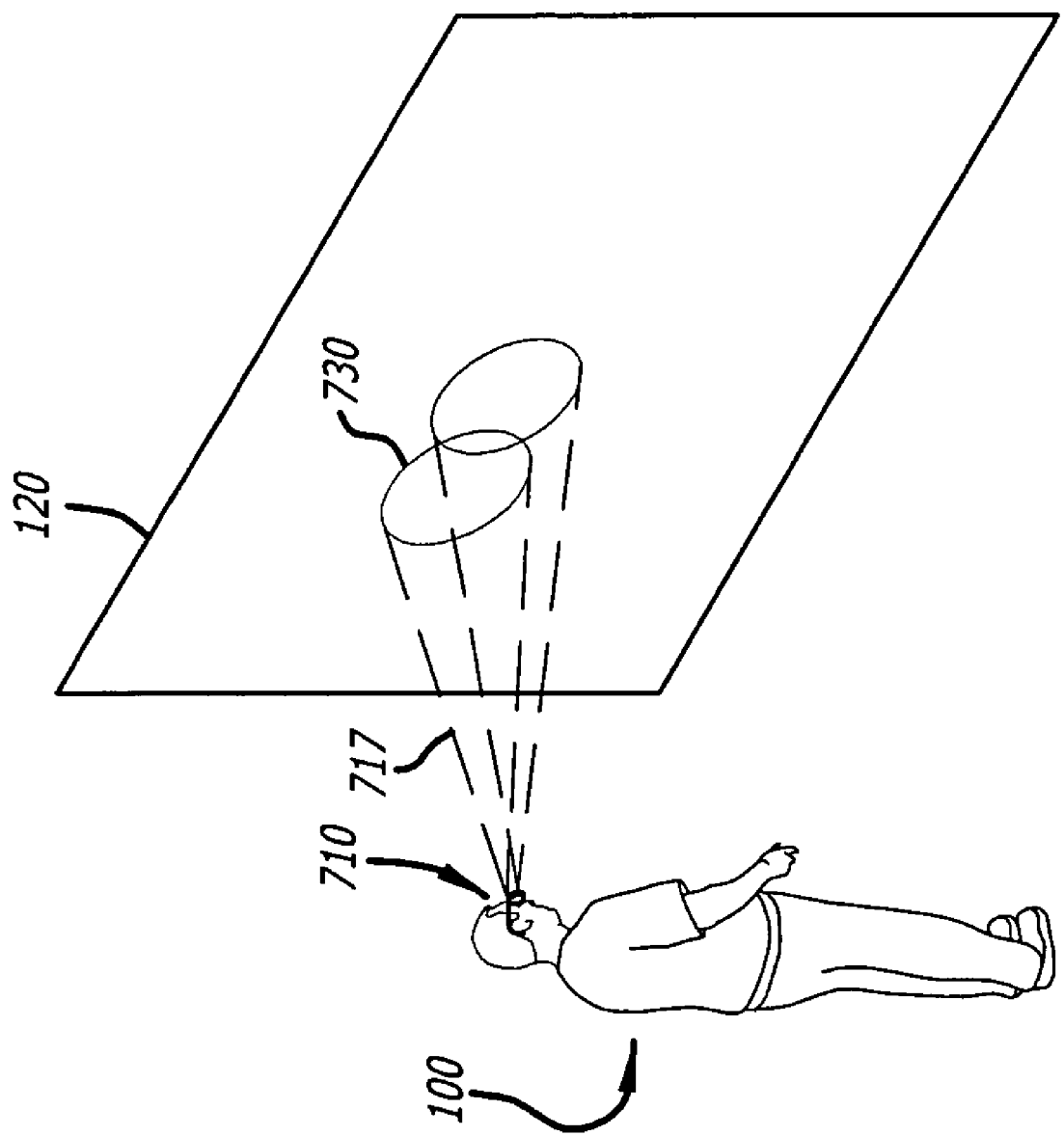
FIG. 7 illustrates a component diagram of an interactive video projection system including spectacles.

FIG. 7 illustrates a component diagram of an interactive video projection system including spectacles. In one embodiment, the user 100 may wear spectacles 710 with an illuminating light source. The light source may be mounted to the sides of eyeglass frames, and aligned so that the light emitted 717 would be substantially collimated with the user's 100 gaze direction when looking straight ahead. If simple keying is employed, the use of two actual sources of head-mounted, relatively broad area, dispersion will cause a double circular area 730 of illumination on the projection surface 120 that will translate to a double disk area of background being exposed on the screen. In one embodiment, the spectacles 710 will make the image appear to be the stylized representation that one might expect to see if one had x-ray eyesight with each large patch of cutout area representing one eye's view through the obscuring surface.

In another embodiment, a computer may be used to draw the substituted area representing the background view; the cutout area 730 can be chosen to always be this double-lobed shape even if a single light beam is used from the spectacles 710. Alternatively, if two beams are used in the computer-drawn application, and those beams are slightly directed outwards from the viewer's head, the computer can determine from the spacing and orientation of the two projected spots, the orientation of the user's head and his distance from the projection surface, and automatically adjust the size of the cutout and its orientation, matching it so that if the user 100 tilts his head from side to side, the projected double-lobed hole 730 rotates with the user 100. The background and foreground image do not move with tilts of the user's 100 head, only the cutout area shape 730.

Direct Capturing of the Independent Source

Figure 8A:
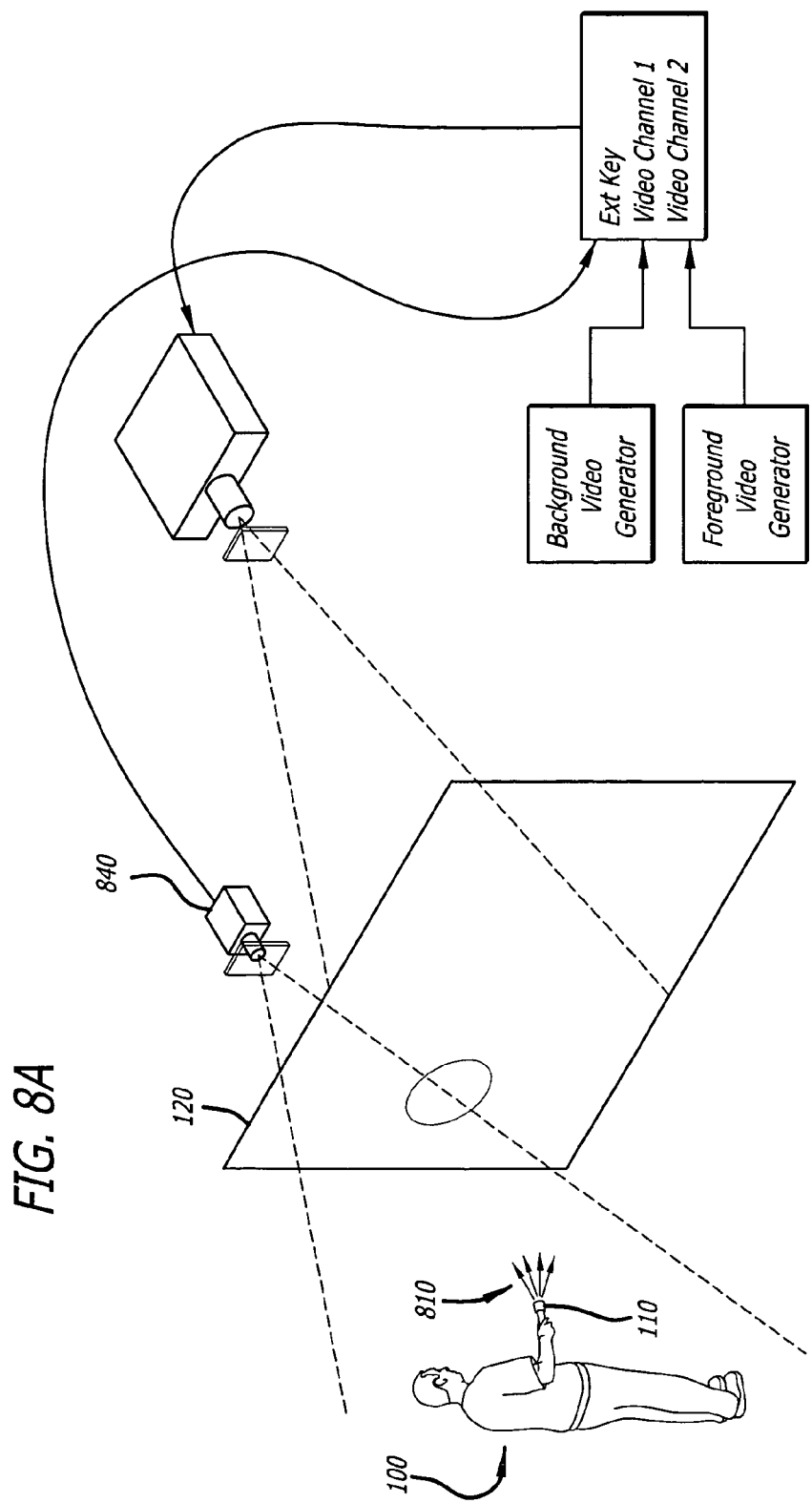
FIG. 8A illustrates a component diagram of an interactive video projection system where a camera directly captures an infrared source.

A camera can be positioned within the projection system in such a way that the camera can capture the independent source directly and not through the projection surface or any other object. The independent source can be an infrared light. FIG. 8A illustrates a component diagram of an interactive video projection system where a camera directly captures an infrared source. In one embodiment, an infrared video camera 840 is not placed behind a projection surface 120, but rather, the video camera 840 is placed to directly observe the pointing device 110 location. Further, instead of producing a collimated light, the pointing device 110 can be a point source of infrared light 810 that is captured by infrared camera 840. The user is free to move the pointing device is various directions in order to signal his intended screen selection area.

Figure 8B:
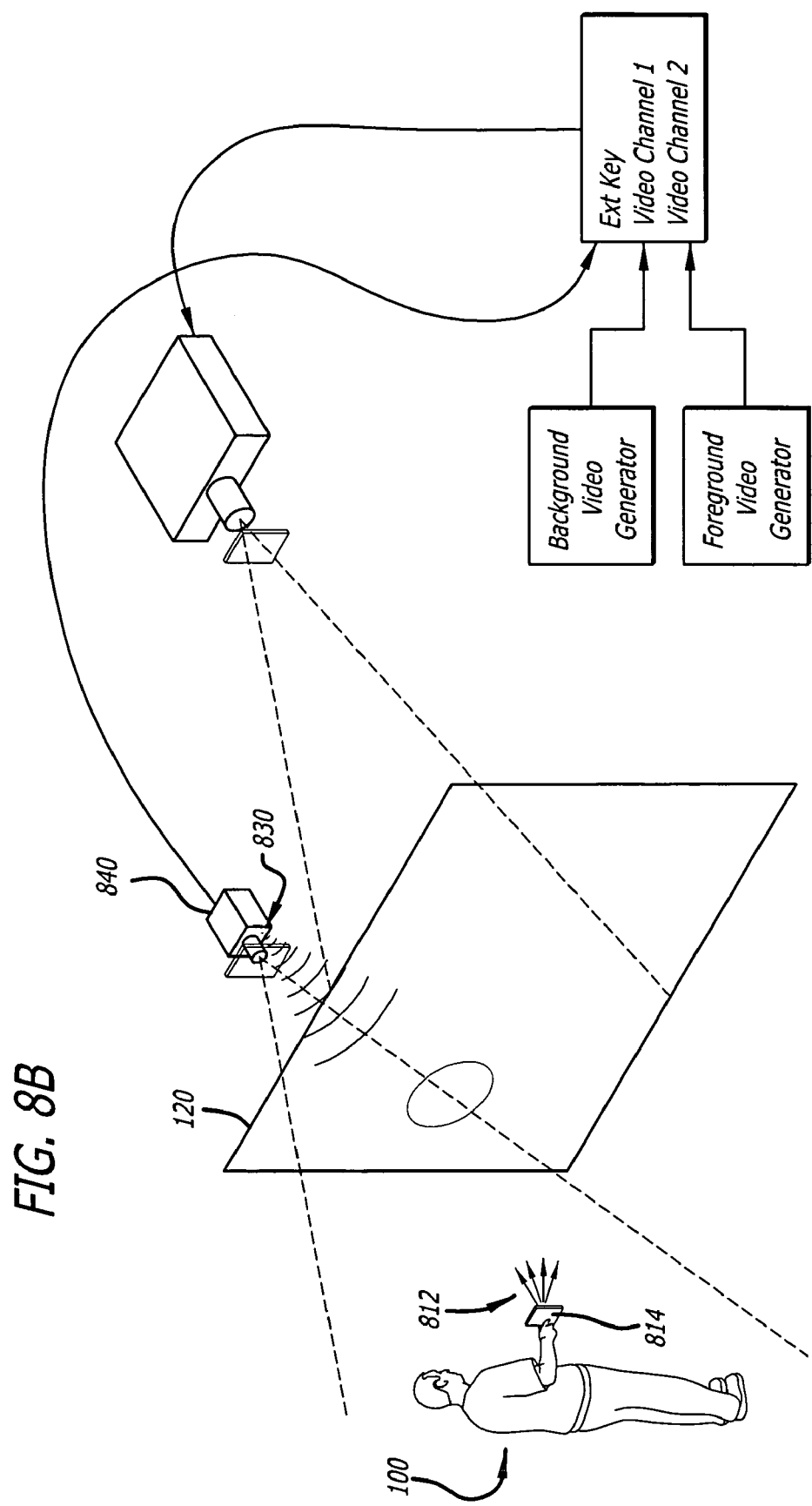
FIG. 8B illustrates a component diagram of an interactive video projection system where a camera captures retro-reflected infrared light.

FIG. 8B illustrates a component diagram of an interactive video projection system where a camera captures retro-reflected infrared light. User 100 can hold a retro-reflective target 814, and camera 840 has a point source infrared emitter 830 attached. The light emitted by the point source infrared emitter 830 is received at the retro-reflective target 814 which then in turn retro-reflects light 812. In one embodiment, the retro-reflected light 830 can be used by the system to determine the user 800 desired screen selection position. Furthermore, the shape of the retro-reflective target 814 may be made distinct for each user 100 such that the beam of light retro-reflected from the retro-reflective target 814 can be distinct from one another.

Figure 9:
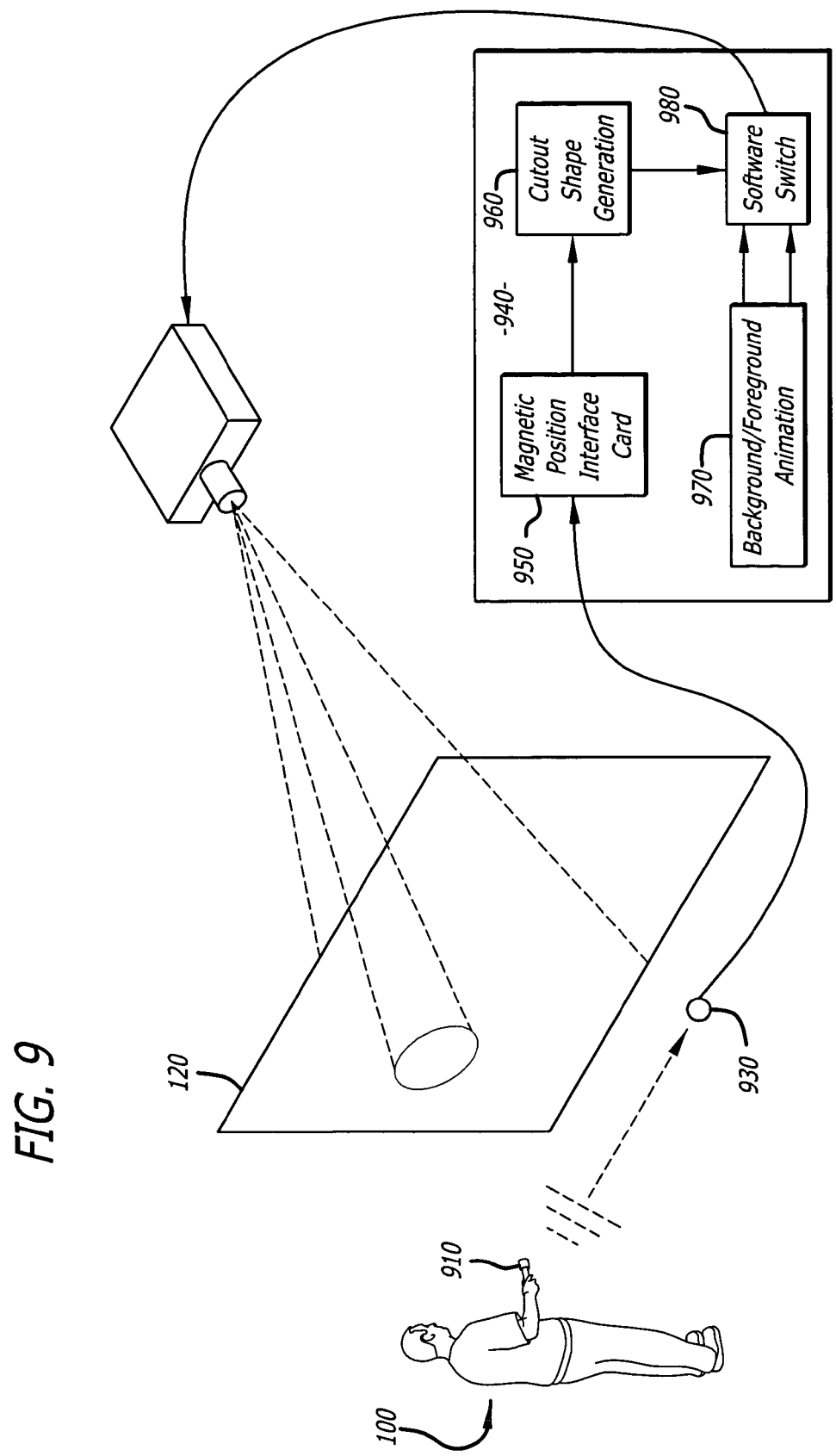
FIG. 9 illustrates a component diagram of an interactive video projection system which uses an electromagnetic source.

In yet another embodiment, an electromagnetic receiver can be positioned within the projection system such that the electromagnetic receiver can directly capture the position and orientation of the independent source. The independent source can be a magnetic source. FIG. 9 illustrates a component diagram of an interactive video projection system which uses an electromagnetic source. A user 100 can point to the projection surface 120 via an electromagnetic position transmitter located inside the pointing device 910. A Polhemus electromagnetic system is a suitable example of a readily available electromagnetic position transmitter and electromagnetic receiver 930. An electromagnetic receiver 930 receives the magnetic field information from transmitter in pointing device 910 and is used by software-based image substitution system 940 to determine the area for video interchange. Thus, a magnetic position interface card 950 receives the signal from the electromagnetic receiver 930 and sends the received information to a cutout shape generation process 960. The cutout shape generation process 960 generates the section of the projection surface 120 where the background image is to be projected. Software switch 980 combines the background and foreground imagery stored in a storage module 970 and sends the final image to the projector.

Multiple Screens

Figure 10:
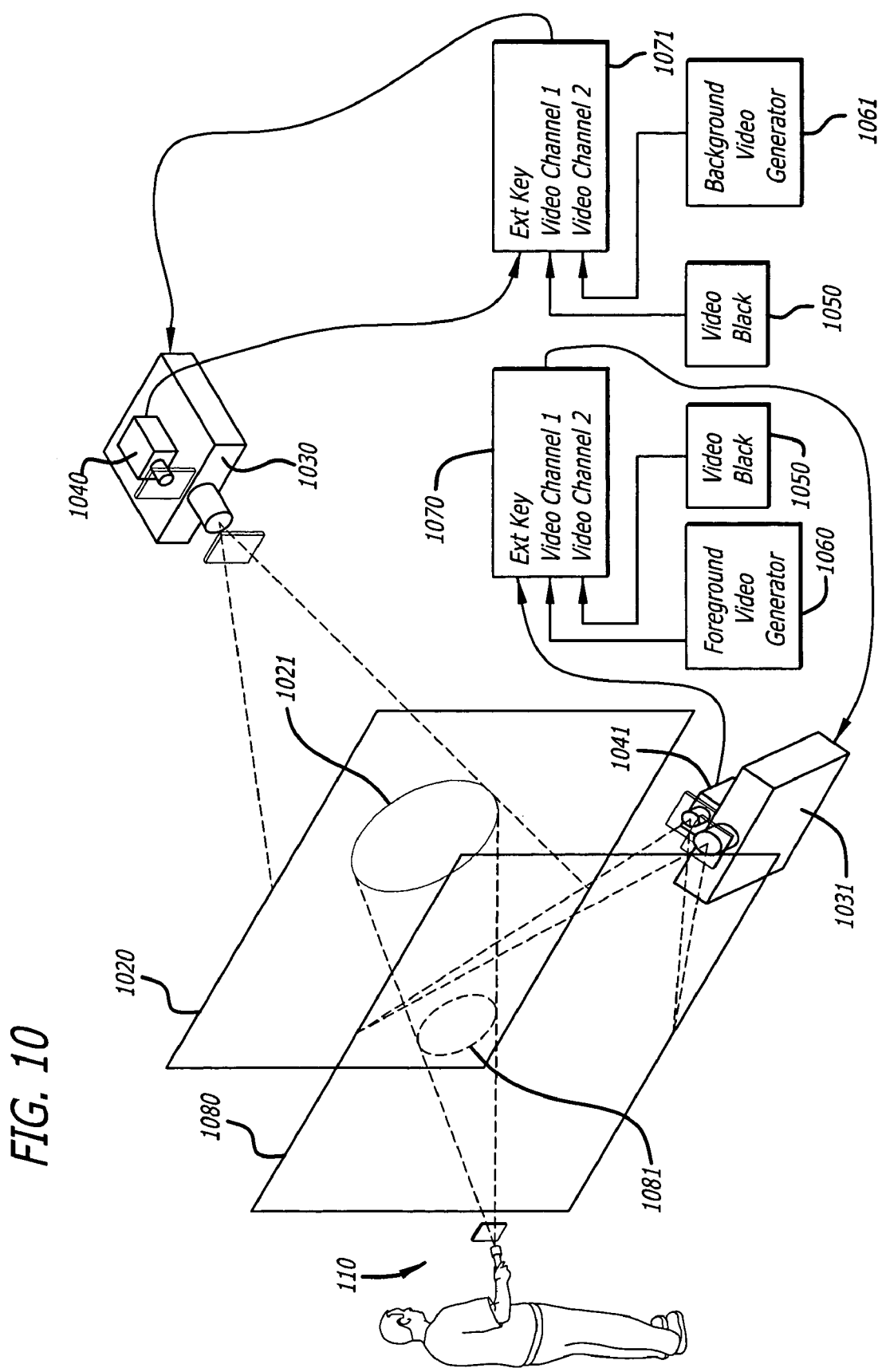
FIG. 10 illustrates a component diagram of an interactive video projection system using a scrim and a screen.

The projection system can be comprised of multiple projection surfaces. FIG. 10 illustrates a component diagram of an interactive video projection system using a scrim and a screen. A screen 1020 can be a background projection surface, and a scrim 1080 can be a foreground projection surface. Scrim 1080 is a transparent fabric generally used to create special effects of lights or atmosphere. Scrim 1080 appears solid when projected upon. However, scrim 1080 is relatively transparent in areas where no light falls on scrim 1080 and a bright surface is behind scrim 1080. A projector 1031 can be positioned in between screens to project any foreground image on scrim 1080. Projector 1031 is positioned to project at a very steep angle so that any light from the projector that passes through scrim 1080 does not impinge on the user 100 but rather projects upwards and therefore is imperceptible to the user.

The rear screen 1020 is observed by camera 1040 and the front scrim 1080 is observed by camera 1041. In one embodiment, the pointing device 110 can project infrared light that passes through scrim 1080 lighting the area 1081. The beam passes through scrim 1080 and continues to light screen 1020 by projecting light on area 1021.

In one embodiment, the keyer 150 creates two images. A first image is composed of the foreground image and with a black area such as 1081. The second image is composed of a background image in area 1021 and the rest being a black image. Thus, light falling on a patch of scrim 1080 causes the illuminated area 1081 to be selected for the projection of black. In other words, projector 1031 does not project an image on area 1081. However, projector 1031 continues to project foreground light everywhere else on the scrim 1080.

Likewise, infrared light from pointing device 110, passing through scrim 1080 and falling on screen 1020, causes background video to be selected for projection in this area by projector 1030, and black to be projected in all other areas. In this manner, the scrim 1080 will appear to have a deep hole at the position of the beam, exposing the recessed background image on area 1021 of the rear screen 1020.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. For instance, various combinations of front and rear-projection may advantageously be employed in certain situations. For example, in embodiments using polarization, the projector may instead be a front projection module, and the camera would detect the position of the flashlight beam by the reflection of its beam light off the screen surface.

Finally, it will also be apparent to one skilled in the art that the flashlight device may be hand-carried, mounted to a pointing finger, mounted on a ring, mounted in a helmet with direction correlated with the orientation of the helmet faceplate, etc. Accordingly, it is intended that the art disclosed shall be limited only to the extent required by the appended claims and the rules and principles of applicable law.

We claim:

1. A system of selectively projecting images, comprising:
a light source configured to emit light toward a projection surface to define an illuminated area on the projection surface;
a camera directed toward the projection surface configured to detect the illuminated area on the projection surface;
a processing unit coupled to the camera configured to receive signals from the camera indicative of the position of the illuminated area in relation to the projection surface, the processing unit configured to utilize the signals received from the camera to create a first image and a second image to be projected on the projection surface; and
a projector separate from the light source and coupled to the processing unit configured to project the first image on the illuminated area of the projection surface, and a second image on an area of the projection surface that is not illuminated by the light source.

2. The system of claim 1, wherein the processing unit utilizes input data from a first video generator to create the first image, and wherein a keyer utilizes input data from a second video generator to create the second image.

3. The system of claim 1, wherein the first image and the second image are three-dimensional images.

4. The system of claim 1, wherein the projection surface is translucent.

5. The system of claim 1, wherein the projection surface is non-translucent.

6. The system of claim 1, wherein the illuminated area of the projection surface is also projected with the second image.

7. The system of claim 1, wherein the first image is a moving video image.

8. The system of claim 7, wherein the first image is synchronized with an audio output.

9. The system of claim 7, wherein the moving video image is triggered to commence upon the light from the light source impinging on a target area of the projection surface.

10. The system of claim 1, wherein the second image is a moving video image.

11. The system of claim 10, wherein the second image is synchronized with an audio output.

12. The system of claim 10, wherein the audio output is triggered to commence upon light from the light source impinging on the projection surface.

13. The system of claim 1, wherein the first image and the second image are projected from the same side of the projection surface in relation to the light from the light source.

14. The system of claim 1, wherein the first image and the second image are projected from the opposite side of the projection surface in relation to the light from the light source.

15. The system of claim 1, wherein the light source is a flashlight.

16. The system of claim 1, wherein the light source is mounted to a pair of wearable eyeglasses.

17. The system of claim 1, wherein the light source is mounted on a wearable helmet.

18. The system of claim 1, wherein the light source is mounted on a ring.

19. The system of claim 1, wherein the light source comprises a plurality of light beams.

20. The system of claim 1, wherein the light from the light source is an infrared light and the camera is sensitive to infrared light.

21. The system of claim 1, wherein the light from the light source is of a specific wavelength and the camera is sensitive to the specific wavelength.

22. The system of claim 21, wherein the light source can be identified based on the wavelength of the light from the light source.

23. The system of claim 1, wherein the first image is an image representing the present appearance of an object and the second image is an image representing the appearance of an object at a different time than the present.

24. The system of claim 1, further comprising a second projection surface upon which the first image is projected.

25. The system of claim 1, further comprising a computing device that constructs a final image to be projected on the projection surface, the final image including the first image and the second image.

26. The system of claim 1, wherein the first and the second images are projected on one side of the projection surface.

27. The system of claim 1, wherein the projection surface encompasses the surface of a three-dimensional object, the first and the second images being projected on multiple sides of the projection surface.

28. The system of claim 1, further comprising a second light source configured to emit light that defines a second illuminated area on the projection surface, and wherein the projector is configured to project a third image on the second illuminated area of the projection surface.

29. The system of claim 1, further comprising a second projector that receives electrical signals from the camera indicative of the position of the illuminated area in relation to the projection surface, wherein the projector projects the first image on the illuminated area of the projection surface, wherein the second projector projects the second image on an area of the projection surface that is not illuminated by the light from the light source.

30. A method of selectively projecting images, the method comprising:
    creating an illuminated area on a projection surface by directing light from a light source towards the projection surface;
    detecting a position of the illuminated area relative to the projection surface with a camera;
    transmitting signals from the camera to a processing unit, the signals being indicative of the position of the illuminated area relative to the projection surface;
    utilizing at the processing unit the signals received from the camera to create an image to be projected on the projection surface; and
    projecting the image on the projection surface, the image being projected on the illuminated area of the projection surface by a projector separate from the light source.

31. The method of claim 30, further comprising projecting a separate complementary image on an area of the projection surface that is not illuminated by light from the light source.

32. The method of claim 31, wherein the processing unit utilizes input data from a first video generator to create the image, and wherein the processing unit utilizes input data from a second video generator to create the complementary image.

33. The method of claim 31, wherein projecting the image and the complementary image on the projection surface includes utilizing a computing device to construct a final image to be projected on the projection surface, the final image including the image and the complementary image.

34. The method of claim 31, further comprising projecting a third image on a second illuminated area of the projection surface, wherein the second illuminated area is created by light from a second light source.

35. The method of claim 31, wherein transmitting signals from the camera further includes transmitting the signals to a second projector, and wherein the second projector projects the complementary image on an area of the projection surface that is not illuminated by the light from the light source.

36. A system of selectively projecting images, comprising:
    a light source configured to emit light toward a projection surface to define an illuminated area on the projection surface;
    a camera directed toward the projection surface configured to detect the illuminated area on the projection surface;
    a processing unit coupled to the camera configured to receive signals from the camera indicative of the position of the illuminated area relative to the projection surface, the processing unit utilizing the signals received from the camera to establish a position on the projection surface at which an image is to be projected; and
    a projector coupled to the processing unit and separate from the light source configured to project the image onto the position on the projection surface established by the processing unit.

37. The system of claim 36, wherein the projector projects a separate complementary image on an area of the projection surface that is not illuminated by the light from the light source.

38. The system of claim 37, wherein the processing unit utilizes input data from a first video generator to create the image, and wherein a keyer utilizes input data from a second video generator to create the complementary image.

39. The system of claim 37, wherein the image and the complementary image are three-dimensional images.

40. The system of claim 36, wherein the projection surface is translucent.

41. The system of claim 36, wherein the projection surface is non-translucent.

42. A system for selectively projecting images onto a projection surface, comprising:
- a pointing device having a magnetic energy source, the magnetic source configured to generate directional magnetic energy in the vicinity of a projection surface;
- a magnetic receiver in the vicinity of the projection surface, the magnetic receiver configured to detect a position of the magnetic energy relative to the projection surface and direction of the magnetic energy from the magnetic source;
- a processing unit configured to receive signals from the magnetic receiver and indicate the position and pointing direction of the magnetic energy from the magnetic source in relation to the projection surface, wherein the processing unit utilizes the signals received from the magnetic receiver to determine a location coordinate on the projection surface to which a user is pointing the pointing device, wherein the processing unit creates a first image to be projected at the location coordinate on the projection surface, wherein the processing unit creates a second image to be projected on the projection surface at a location on the surface that is not the location coordinate on the projection surface; and
- a projector coupled to the processing unit configured to project the first image and the second image onto the projection surface.

43. The system of claim 42, wherein the processing unit utilizes input data from a first video generator to create the first image, and wherein a keyer utilizes input data from a second video generator to create the second image.

44. The system of claim 42, wherein the first image is a three-dimensional image.

45. The system of claim 42, wherein the first image and the second image are three-dimensional images.

46. The system of claim 42, wherein the projection surface is translucent.

47. The system of claim 42, wherein the projection surface is non-translucent.

* * * * *